United States Patent
Koseki et al.

(10) Patent No.: US 9,007,667 B2
(45) Date of Patent: Apr. 14, 2015

(54) IMAGE READER, IMAGE ERASER, AND RELATED METHODS

(71) Applicant: Toshiba Tec Kabushiki Kaisha, Tokyo (JP)

(72) Inventors: Naoya Koseki, Shizuoka (JP); Mitsuru Hatano, Kanagawa (JP); Sueo Ueno, Shizuoka (JP); Hiroyuki Shiraishi, Shizuoka (JP); Yusuke Hashizume, Chiba (JP); Katsuya Nagamochi, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 8 days.

(21) Appl. No.: 13/783,180

(22) Filed: Mar. 1, 2013

(65) Prior Publication Data

US 2013/0235438 A1 Sep. 12, 2013

Related U.S. Application Data

(60) Provisional application No. 61/607,442, filed on Mar. 6, 2012.

(51) Int. Cl.
*H04N 1/60* (2006.01)
*H04N 1/40* (2006.01)
*H04N 1/48* (2006.01)
*G03G 15/00* (2006.01)
*G03G 21/00* (2006.01)

(52) U.S. Cl.
CPC ......... *H04N 1/6094* (2013.01); *H04N 1/40012* (2013.01); *H04N 1/48* (2013.01); *G03G 15/5062* (2013.01); *G03G 21/00* (2013.01)

(58) Field of Classification Search
USPC ................ 358/474, 1.15, 448, 468, 500, 501, 358/1.16, 518, 1.9, 426.07, 426.11
See application file for complete search history.

(56) References Cited

U.S. PATENT DOCUMENTS

| | | | | |
|---|---|---|---|---|
| 5,642,197 | A * | 6/1997 | Tuhro et al. | 356/418 |
| 2005/0260004 | A1* | 11/2005 | Maebashi et al. | 399/15 |
| 2010/0027059 | A1* | 2/2010 | Ebi | 358/1.15 |
| 2010/0195171 | A1 | 8/2010 | Ishido | |
| 2010/0278404 | A1* | 11/2010 | Takei | 382/128 |
| 2013/0003134 | A1* | 1/2013 | Hazu et al. | 358/448 |
| 2013/0156458 | A1* | 6/2013 | Suzuki | 399/81 |

* cited by examiner

*Primary Examiner* — Jerome Grant, II
(74) *Attorney, Agent, or Firm* — Patterson & Sheridan, LLP

(57) ABSTRACT

According to an embodiment, an image reader for reading an original image formed on a surface of a recording medium is disclosed. The image reader comprises an illumination unit configured to illuminate the surface with a white light source, a light receiving unit comprising a plurality of color image sensors each configured to receive light reflected from the surface to form a monochromatic image, and an image processing synthesis unit configured to process the monochromatic images from the light receiving unit to form a synthesized image. The image reader further comprises an operation unit configured to designate a specific color, and a control unit configured to control the image processing synthesis unit to exclude, from the synthesized image processing, the monochromatic image from the color image sensor that corresponds to the specific color designated in the operation unit.

17 Claims, 6 Drawing Sheets

IMAGE READER, IMAGE ERASER, AND RELATED METHODS

CROSS-REFERENCE TO RELATED APPLICATION

This application is based upon and claims the benefit of priority from U.S. provisional application 61/607,442, filed on Mar. 6, 2012; the entire contents of which are incorporated herein by reference.

FIELD

Embodiments described herein relate to a technique for sharply reading a printed image with a specific color.

BACKGROUND

Recently, a technique for forming images, such as characters or figures printed on a recording medium such as a sheet, by an erasable colorant has been proposed. An image is formed on a sheet by such an erasable colorant, and the image is then erased. With the repetition of this cycle, one sheet can be reutilized several times, thus being able to contribute to resource-saving.

To indicate to a user that this erasable colorant is erasable, for example, a specific color such as blue is sometimes used.

In case an image of an erasable colorant printed on a sheet is read out by an image reader, the image of the erasable colorant of a specific color is sometimes read with low contrast in accordance with light source for illuminating an original which is used in the image reader.

The image reader reads a reflecting image of an original surface illuminated by a light source by an image sensor such as CCD line sensor. If a white light source is used as the light source, an erasable image with a blue color is read with low contrast due to the influence of a blue component which is included in the white light source.

DETAILED DESCRIPTION

According to embodiments, an image reader for reading an original image formed on a surface of a recording medium is disclosed. The image reader comprises an illumination unit configured to illuminate the surface with a white light source, a light receiving unit comprising a plurality of color image sensors each configured to receive light reflected from the surface to form a monochromatic image, and an image processing synthesis unit configured to process the monochromatic images from the light receiving unit to form a synthesized image. The image reader further comprises an operation unit configured to designate a specific color, and a control unit configured to control the image processing synthesis unit to exclude, from the synthesized image processing, the monochromatic image from the color image sensor that corresponds to the specific color designated in the operation unit.

According to additional embodiments, an eraser for erasing an original image printed with an erasable colorant on a surface of a recording medium is disclosed. The eraser comprises an illumination unit configured to illuminate the surface with a white light source, a light receiving unit comprising a plurality of color image sensors each configured to receive light reflected from the surface to form a monochromatic image, and an image processing synthesis unit configured to process the monochromatic images from the light receiving unit to form a synthesized image. The eraser further comprises an operation unit configured to designate a specific color, and a control unit configured to control the image processing synthesis unit to exclude, from the synthesized image processing, the monochromatic image from the color image sensor that corresponds to the specific color designated in the operation unit. The eraser further comprises an erasing unit configured to erase the original image.

According to additional embodiments, an image reading method is disclosed. The image reading method comprises illuminating a surface of a recording medium with a white light source, and forming a monochromatic image in each of a plurality of color image sensors from light reflected from the surface. The image reading method further comprises receiving a designation of a specific color, and processing the monochromatic images, except the monochromatic image from the color image sensor that corresponds to the designated specific color, to form a synthesized image.

Next, the erasing device provided with the image reader of this embodiment will be explained in detail with reference to the drawings.

Figure 1:
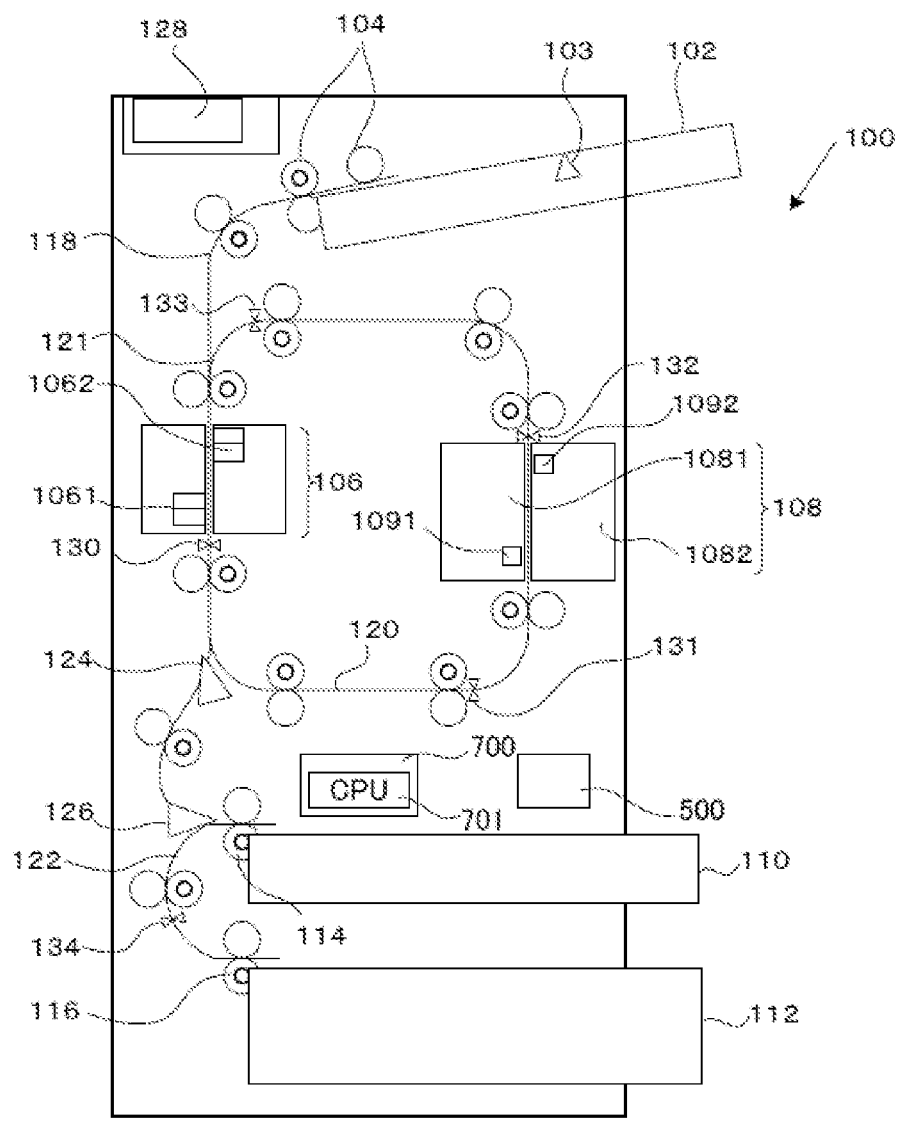
FIG. 1 is a diagram illustrating a color eraser, according to an embodiment.

FIG. 1 is a diagram illustrating the configuration of the erasing device. An erasing device 100 applies an erasing process, which erases a color of an image formed by a color-erasable colorant on a sheet. The image was formed by a color-erasable colorant, such as a color-erasable toner or a color-erasable ink. The color-erasable colorant may also include a colorable compound, a developer, and a erasing agent. As the colorable compound, for example, a leuco dye can be used. As the developer, for example, phenols can be used. As the erasing agent, a substance, which is made compatible with the colorable compound by being heated and does not have affinity for the developer, can be used. The color-erasable colorant generates a color by the interaction of the colorable compound and the developer and is decolorized because the interaction of the colorable compound and the developer is cut off by heating to an erasing temperature or higher. Hereafter, the color-erasable colorant is simply called a recording material.

The erasing device 100 includes a paper feed tray 102, a paper feed member 104, a read unit 106, an erasure unit 108, a first tray 110, a second tray 112, discharge members 114 and 116, a first conveyance path 118, a second conveyance path 120, a third conveyance path 122, a first branch member 124, a second branch member 126, and an operation unit 128.

The paper feed tray 102 is loaded with sheets for reuse. The paper feed tray 102 is loaded with sheets in various sizes such as A4, A3, and B5. On the sheet that is loaded into the paper feed tray 102, for example, an image is formed by the recording material, and the image is erasable by heating the recording material to a prescribed erasing temperature or higher. The paper feed member 104 has pickup rollers, sheet feed rollers, and separation rollers which are disposed opposite the sheet feed rollers. The paper feed member 104 feeds sheets one sheet at a time from the sheet at the uppermost position loaded on the paper feed tray 102 to the first conveyance path 118 in the erasing device 100. In addition, the paper feed tray 102 includes a detection sensor 103, hereinafter referred to as a paper feed start detection sensor, for detecting the existence of a sheet on the paper feed tray 102. The paper feed start detection sensor 103 may be, for example, a microsensor or microactuator. If the paper feed start detection sensor 103 detects loading of sheets, the sheets loaded are fed in a set paper feed mode. The paper feed is controlled by a CPU 701 of a paper feed control unit 700.

The first conveyance path 118 forms a conveyance path from the paper feed tray 102 toward the first tray 110. The first conveyance path 118 conveys the fed sheets to the read unit 106 or the first tray 110.

The read unit 106 is disposed along the first conveyance path 118 at a position downstream in a sheet conveying direction with respect to the paper feed tray 102. The read unit 106, for example, reads images using an image sensor such as Charged Coupled Device (CCD) scanner or CMOS sensor.

In this embodiment, the read unit 106 reads each image of a first surface and a second surface of the sheets that are conveyed. In other words, the read unit 106 comprises a first read unit 1061 and a second read unit 1062, which are arranged along the first conveyance path 118 via the conveyance path, and can read both surfaces of the images of the sheets. The position where the image sensor of the read unit 106 reads the images of the sheets is called a read position.

The first read unit 1061 and the second read unit 1062 store the read images in a memory unit 500. For example, an image on a sheet read by the read unit 106 is electronically processed and stored in the memory unit before an erasing process, so that when data of the erased image is required later, the image data can be obtained. At that time, since several sheets loaded into the paper feed tray 102 are fed sequentially from the sheet at the uppermost position, it is difficult to add more sheets during the paper feed, and the several sheets loaded once are erased at one unit of the erasing process. In addition, a control unit 200, which will be described later, decides whether sheets can be erased and reused based on images read by the read unit 106.

At a downstream of the read 106, there is the first branch member 124 as a switching unit. The first branch member 124 switches the conveying direction of sheets which are conveyed through the first conveyance path 118, to the second conveyance path 120 or to the first tray 110.

The second conveyance path 120 branches, at a branch point where the first branch member 124 is disposed, from the first conveyance path 118. The second conveyance path 120 conveys the sheets to the erasure unit 108.

In addition, the second conveyance path 120 joins the first conveyance path 118 at a confluence point 121 upstream in the sheet conveying direction from the read unit 106. In other words, the second conveyance unit 120 joins the first conveyance path 118 at the confluence point 121 between the paper feed tray 102 and the read unit 106.

Therefore, the second conveyance path 120 can re-convey sheets to the read 106 via the erasure unit 108. In other words, the erasing device 100 can convey the sheets fed from the paper feed member 104 to the read unit 106, erasure unit 108, and the read unit 106 again, in order by controlling the first branch member 124.

The first conveyance path 118 includes the second branch member 126 at a location downstream of the first branch member 124. The second branch member 126 guides the sheets conveyed from the first branch member 124 to the first tray 110 or the third conveyance path 122. The third conveyance path 122 conveys the sheets to the second tray 112.

The erasure unit 108 erases images on sheets that are conveyed. For example, in a state in which the erasure unit 108 contacts a sheet that is conveyed, the erasure unit heats the sheet to a prescribed erasing temperature to erase a color of an image formed on the sheet by a recording material. For example, the erasure unit 108 of this embodiment has two erasing units 1081 and 1082 for the first surface erasure and the second surface erasure of the sheet.

The erasing units 1081 and 1082 are oppositely arranged on both sides of the second conveyance path 120. The erasing unit 1081 contacts and heats a sheet from one surface of the sheet. The erasing unit 1082 contacts and heats the sheet from the other surface of the sheet. In other words, the erasure unit 108 erases images on both surfaces of a sheet.

The position where the erasing units 1081 and 1082 heat a sheet—that is, the position where heating units (not shown in the drawing) of the erasing units 108a and 108b erase a color of an image by applying heat to a sheet—is called an erasing position. The erasure unit 108 has temperature sensors 1091 and 1092 for detecting the temperature of the heating units of the erasing units 1081 and 1082. The temperature sensors 1091 and 1092 may be a contact type or a noncontact type of sensor.

The operation unit 128 disposed in the device body of the erasing device 100 has a touch panel-type display unit and various kinds of operation keys. The operation unit 128 may be disposed in the upper part of the main body of the erasing device, for instance. The operation keys, for example, include a ten-key keypad, a stop key, a start key, etc.

In this embodiment, papers are fed in a paper feed mode, which will be described later, where sheets loaded into the paper feed tray 102 are set. A user instructs a functional operation of the erasing device 100 such as start of erasing processing or read of an image of a sheet, which has been subject to erasing processing, in addition to a setup operation of the paper feed mode by the operation unit 128.

The operation unit 128 inputs information of an image color printed on a sheet which is erased. In addition, the operation unit 128 displays setup information or operation status of the erasing device 100, log information, or messages to the user.

Here, the operation unit 128 is not limited to the arrangement in the main body of the erasing device 100. For example, it may be operated from an operation unit of an external device connected to the erasing device 100 via a network. The operation unit may be in an arrangement independent of the main body of the erasing device and may operate the erasing device 100 by wire or wireless communications. The operation unit of this embodiment may be able to issue process instructions to the erasing device 100 or may be able to read information.

The discharge members 114 and 116 discharge sheets to the first tray 110 and the second tray 112 vertically arranged in the lower part of the main body. For example, the first tray 110 loads reusable sheets after images on the sheets are erased. The second tray 112 loads sheets that have been deemed impossible to be reused. Hereinafter, the first tray 110 is called a reuse tray, and the second tray 112 is called a reject tray. Here, the reuse tray 110 and the reject tray 112 can also replace sheets to be received. The setup for loading certain sheets in each tray—that is, the setup for a conveyance destination of sheets—for example, may be carried out from the operation unit 128. With this setup, the second branch member 126 switches the conveyance path and guides conveyed sheets to the first tray 110 or the third conveyance path 122.

The erasing device 100 has several sheet detection sensors 130, 131, 132, 133, and 134 for detecting sheets that are conveyed through the first to third conveyance paths 118, 120, and 122. The sheet detection sensors, for example, may be microsensors or microactuators. The sheet detection sensors are arranged at appropriate positions of the conveyance paths.

In a classification process, the control unit 700 decides whether or not sheets are reusable based on the images read by the read unit 106. For example, in the classification process, the control unit 700 decides whether or not a residual image exists on a sheet based on the data read by the read unit 106 and decides that the sheet cannot be reutilized, if there is a residual image. For example, if a sheet subjected to erasure processing by the erasure unit 108 is read and a non-erased image remains, the control unit 200 decides that the sheet cannot be reutilized because of the existence of a non-erased portion. In addition, in the classification processing, the control unit 700 decides the existence of wrinkle depth, fold, and breakage based on data read by the read unit 106. If the wrinkle depth is a prescribed value or greater or there is a fold, breakage, or hole in a sheet, the erasing device 100 decides that the sheet cannot be reused.

In a pre-classification process, the control unit 700 decides the printing rate of an image on a sheet based on the data read by the read unit 106 before an erasing process. If the printing rate is a prescribed value or greater, the control unit 700 does not implement an erasing process and decides that the sheet cannot be reutilized. The control unit 700 discharges the sheet, which has been deemed unreusable, to the reject tray 112. Alternatively, the control unit 700 may decide whether or not prohibition data, which indicates that the erasure of confidential data is to be prohibited, is included in the data of the sheet image read by the read unit 106. If such prohibition data is included, the control unit 700 conveys the sheet to the reject tray 112.

Selection(s) can be made for: whether or not an image is read by the read unit 106 before the erasing process, whether or not the erasing process is implemented, whether or not the classification process is implemented, and whether or not the automatic paper feed process is implemented.

The selection of each process can be set by the operation unit 128 of the erasing device 100. Here, the selection of implementing processes may be set from an external terminal without being limited to the operation unit 128 of the erasing device 100. The paper feed process, read process, erasing process, classification process, or pre-classification process can be selected in an appropriate combination via the operation unit 128, etc. Here, in the erasing device 100 of this embodiment, if the processes are combined, as an example, the paper feed process, the read process, the decolorization process, and the classification process in order are preferentially implemented. In addition, it is assumed that the order of priority of the read process and the pre-classification process is equal.

For example, if the read process, the decolorization process, and the classification process are selected, the erasing device 100 implements the read process of the read unit 106, the erasing process of the erasure unit 108, and the classification process of the read unit 106 in order.

In other words, before the erasure unit 108 erases an image on a sheet, the read unit 106 first reads the image of the sheet, then the erasure unit 108 erases the image of the sheet, and then the read unit 106 reads the image of the erased sheet.

If the pre-classification process, the decolorization process, and the classification process are selected, the erasing device 100 applies the pre-classification process of the read unit 106, the decolorization process of the erasure unit 108, and the classification process of the read unit 106 in order.

In case the read process and the pre-classification process are selected, the erasing device 100 simultaneously carries out the read process based on data read by the read unit 106 and the pre-classification process based on the printing rate.

Here, the erasing device 100 is not limited to an appropriate selection of the processes of a user. For example, the erasing device 100 may have a process mode in which a combination is predetermined, and a user may select the process mode. The control unit 700 of the erasing device 100 appropriately changes the conveyance path of sheets based on the selected process.

The control unit 700 controls the various units in the device based on signals from a detection unit 212. The detection unit 212 includes the paper feed start detection sensor 103, temperature sensors 1091 and 1092, and the sheet detection sensors 130, 131, 132, 133, 134, etc., shown in FIG. 1. The control unit 700 determines the existence of a sheet on the paper feed tray 102 based on a signal from the detection sensor 103. In addition, the control unit 700 detects the temperature of the heating units of the erasing units 1081 and 1082 by the temperature sensors 1091 and 1092 and controls the temperature of the heating units of the erasing units 1081 and 1082. Moreover, the control unit 200 detects the positions of sheets in the first to third conveyance paths 118, 120, and 122 by the sheet detection sensors 130, 131, 132, 133, and 134. For example, the control unit 700 detects sheets passed through the read unit 106 by the sheet detection sensor 130 in the vicinity of downstream of the read unit 106.

The memory unit 500 stores an application program and an OS. The application program includes programs for implementing functions of the erasing device such as a read function of the read unit 106 and an erasing function of the erasure unit. The application program further has an application for Web clients (Web browser) and other applications. The memory unit 500 stores images read by the read unit 106. In addition, the memory unit 500 stores the number of sheets processed in the erasing device 100. The memory 500, for example, may be a hard disk drive, other magnetic memory devices, optical memory devices, semiconductor memory devices such as a flash memory, or these optional combinations.

Figure 2:
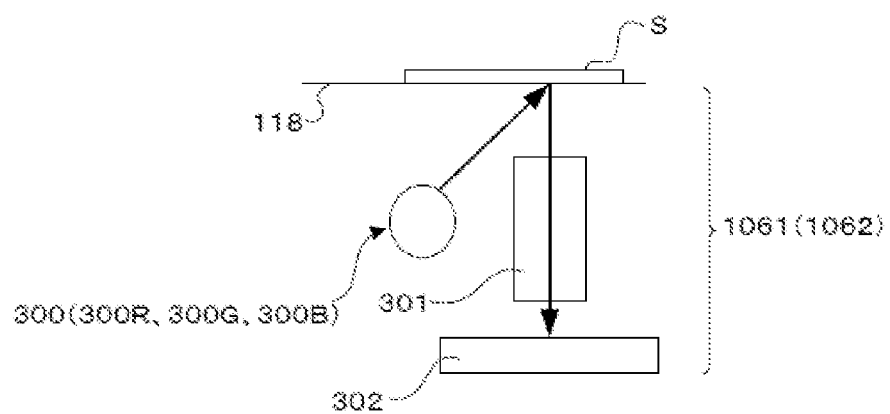
FIG. 2 is a diagram illustrating a first read unit, according to the embodiment.

FIG. 2 is an outlined diagram showing the first read unit 1061 and the second read unit 1062 of the read unit 106. The first read unit 1061 and the second read unit 1062 have the same configuration and have an illumination unit 300 with a LED (Light Emitting Diode) light source for illuminating an image surface of a sheet S, a color image sensor 302, and imaging sensor 301 for capturing image light which has been reflected by the image surface of the sheet S onto the color image sensor 302.

The illumination unit 300 controls the red LED light source, the green LED light source, and the blue LED light source to emit lights at a prescribed luminance to obtain a pseudo-white light.

Figure 3:
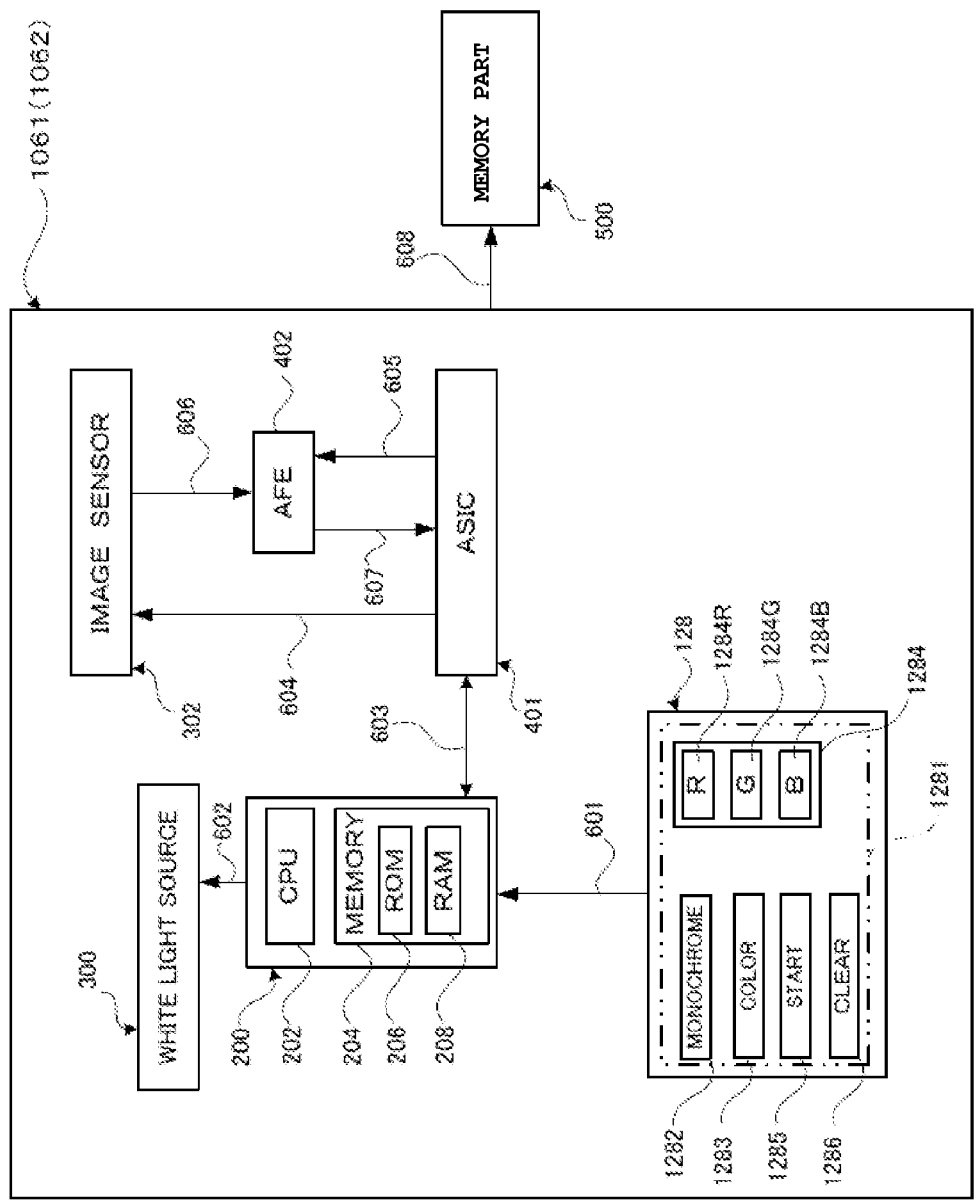
FIG. 3 is a block diagram illustrating a hardware configuration of the first read unit, according to the embodiment.

FIG. 3 is a block diagram showing a hardware configuration of the first read unit 1061 and the second read unit 1062 of the read unit 106. Here, the hardware configuration for the first read unit 1061 is shown in FIG. 3. The hardware configuration (not shown in the drawing) for the second read unit 1062 is also similar.

In FIG. 3, the first read unit 1061 includes the control unit 200 for image processing, an ASIC unit 401 as an image processing synthesis unit, an AFE (Analog Front End) unit 402 as an A/D conversion unit, the color image sensor 302 such as CCD, and the white light source illumination unit 300.

The color image sensor 302 has a red light receiving unit for receiving a red light, a green light receiving unit for receiving a green light, and a blue light receiving unit for receiving a blue light. For example, if the original image color is blue, a blue-wavelength light of a white light source of the illumination unit 300 is reflected on the original image, transmitted through a blue filter of the blue light receiving unit, and received. However, in the red light receiving unit and the green light receiving unit, the blue component of the original image is cut, receiving no lights. For this reason, the original image is recognized as a white color in the blue light receiving unit and recognized as a black color in the red light receiving unit and the green light receiving unit.

The control unit (controller) 200 has a processor 202 comprising a CPU (Central Processing Unit) or an MPU (Micro Processing Unit), and a memory 204.

The memory 204, for example, is a semiconductor memory and has a ROM (Read Only Memory) 206 for storing various kinds of control programs and a RAM (Random Access Memory) 208 for providing a temporary work area to the processor 202.

The operation unit 128 shown in FIG. 3 shows a state in which a selective screen 1281 in an output image mode is displayed by the operation of a touch panel-type display unit. Displayed on the selective screen 1281 are a monochrome output switch unit 1282, a color output switch unit 1283, an image printing color setup unit 1284, a start switch 1285, and a mode clear switch 1286. In addition, in the image printing color setup unit 1284, for example, a red switch unit 1284R for selecting a red color as an image printing color, a green switch unit 1284G for selecting a green color, and a blue switch unit 1284B for selecting a blue color are displayed.

The control unit 200 controls the light source 300 and the ASIC unit 401 based on a switch-on signal selectively operated on the selective screen 1281 of the operation unit 128 and starts reading by turning-on of the start switch 1285.

The operation unit 128 outputs a mode selecting signal 601, including an output image color signal for determining an output image of a monochromic output or a color output, and a color information selecting signal showing a printing color of an original image to the control unit 200.

The control unit 200 outputs a LED light source ON signal 602 for emitting the illumination unit 300 by a white light to the illumination unit 300 based on the mode selecting signal 601.

Here, for example, if the blue switch unit 1284B is turned on by turning-on of the monochrome output switch unit 1282, the operation unit 128 transmits the mode selecting signal 601 for reading a blue original image color in a monochrome mode to the control unit 200.

The control unit 200 transmits a read control signal 603 based on the mode selecting signal to the ASIC unit 401.

The ASIC unit 401 outputs an image control signal 604 to the color image sensor 302 and starts reading of an image. In addition, the ASIC unit 401 outputs an AFE control signal 605 to the AFE unit 402 and converts analog image data 606 received by each light receiving unit of R, G, and B of the color image sensor 302 into a digital image.

Figure 4:
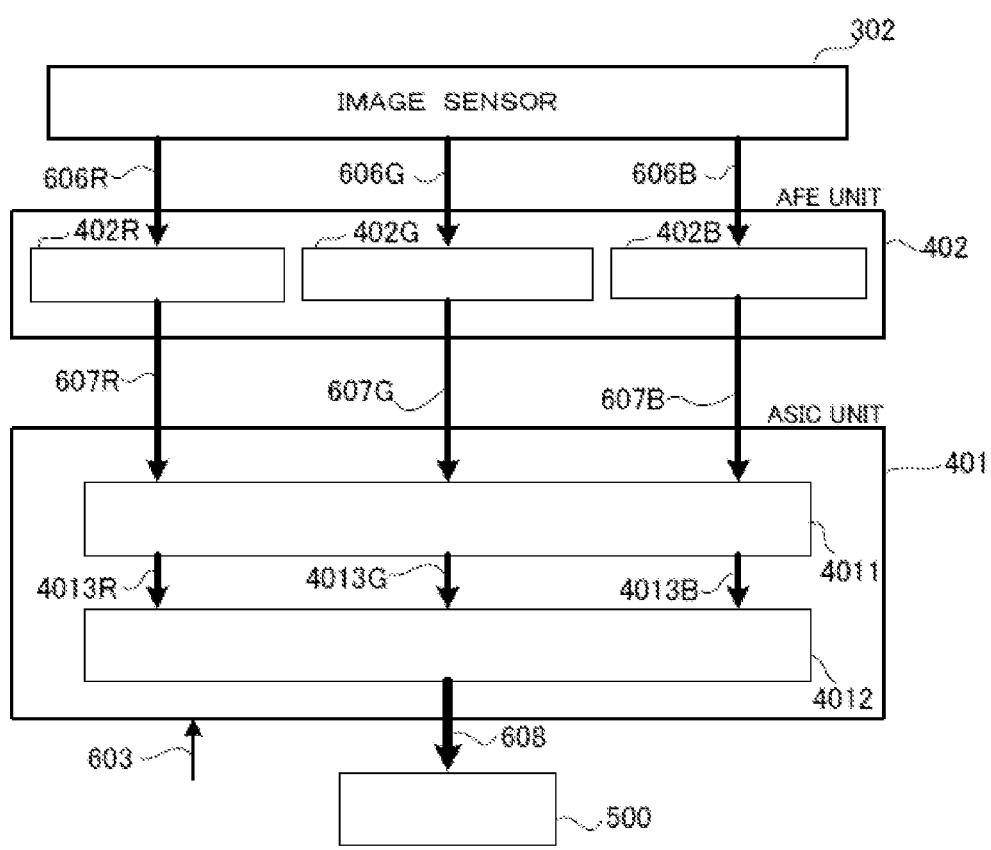
FIG. 4 is a block diagram illustrating a configuration of an AFE unit and an ASIC unit and illustrating a processing of the ASIC unit in a normal read mode, according to the embodiment.
Figure 5:
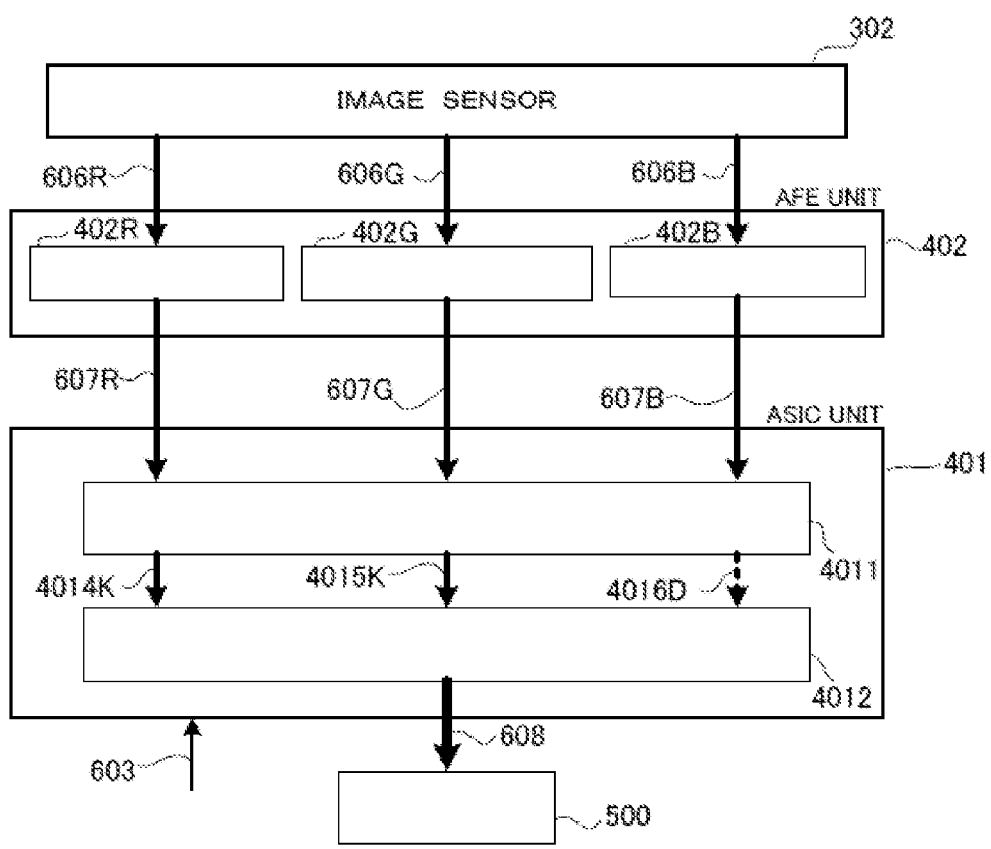
FIG. 5 is a block diagram illustrating the hardware configuration of the AFE unit and the ASIC unit and illustrating a processing of the ASIC unit in a monochrome read mode, according to the embodiment.

FIG. 4 is a block diagram illustrating a hardware configuration of the AFE unit and the ASIC unit and shows a processing of the ASIC unit in a normal read mode. FIG. 5 is a block diagram illustrating the hardware configuration of the AFE unit 402 and the ASIC unit 401 and shows a processing of the ASIC unit in a monochrome read mode.

In FIG. 4 and FIG. 5, the AFE unit 402 includes a red data conversion unit 402R for digitally converting a red analog image signal 606R, which is output from the red light receiving unit of the color image sensor 302, into a red digital image signal 607R. Likewise, the AFE unit 402 includes a green data conversion unit 402G for digitally converting a green analog image signal 606G, which is output from the green light receiving unit, into a green digital image signal 607G. The AFE unit 402 also includes a blue data conversion unit 402B for digitally converting a blue analog image signal 606B, which is output from the blue light receiving unit, into a blue digital image signal 607B.

The ASIC unit 401 has an image processing unit 4011 for image-processing the digital image signal 607 and an image synthesis unit 4012 for synthesizing the images processed in the image processing unit 4011.

In the image processing unit 4011, the image processing is different in a normal mode (output of a color image) and a monochrome mode (output of a monochrome image) of the read control signal 603 from the control unit 200.

In the normal mode, the image processing unit 401, as shown in FIG. 4, processes the respective digital image signals 607R, 607G, and 607B of each color of red, green, and blue and outputs red processing image signal 4013R, green processing image signal 4013G, and blue processing image signal 4013B to the image synthesis unit 4012.

On the other hand, in the monochrome mode, the image processing unit 401 processes the respective digital image signals 607R, 607G, and 607B of each color of red, green, and blue into monochrome images and outputs monochrome image signals 4014K, 4015K, and 4016K to the image synthesis unit 4012. However, if a specific color is selected in the image printing color setup unit 1284, the monochrome image signal related to the image signal from the light receiving unit of the same color as the selected specific color is excluded, and the monochrome image signals from the light receiving units of the other two colors are synthesized in the image synthesis unit 4012.

FIG. 5 shows the case where the blue switch unit 1284B is turned on in the image printing color setup unit 1284. The monochrome image signal 4014K, in which the image from the red light receiving unit is processed into a monochrome image, and the monochrome image signal 4015K, in which the image signal from the green light receiving unit is processed into a monochrome image, are output to image synthesis unit 4012. However, the monochrome image signal 4016K, in which the image from the blue light receiving unit is processed into a monochrome image, is not output to the image processing unit 4012. The ASIC unit 401 stores the image data 608, in which the monochrome images are synthesized in the image synthesis unit 4012, in the memory unit 500. Here, the color image sensor 302 will be explained using a three-line CCD sensor of R, G, and B; however, a four-line sensor with a monochromic sensor may also be used.

In this embodiment, a reflected light of an original image illuminated by the white light source 300 is incident on the color image sensor 302. In this case, in case the original image is a blue color or a color close to the blue color, since the blue component is included in an illuminating light, the blue component is read into the blue light receiving unit, which reads the original image, and recognized as a white image. On the contrary, since the image light of the blue component is not received in the red light receiving unit and the green light receiving unit, the image light is recognized as a black image. For this reason, images of black, black, and white colors are output from the light receiving units of three colors, and when these images are synthesized, a gray image is output, obtaining a thin image.

In this embodiment, if the monochrome output switch unit 1282 is turned on, the control unit 200 outputs the read control signal 603 for outputting a monochrome image to the ASIC unit 401.

The image processing unit 4011, for example, employs a binary-coded processing as an image processing into a monochrome image. The binary-coded processing, i.e., the image processing, adopts a gradation value equal or greater than a threshold set for the digital image signals 607R, 607G, and 607B of each color of red, green, and blue digitally converted into a multi-gradation, for example, 256 gradations as a black color. A gradation value smaller than the threshold as a white color, can be used.

Figure 6:
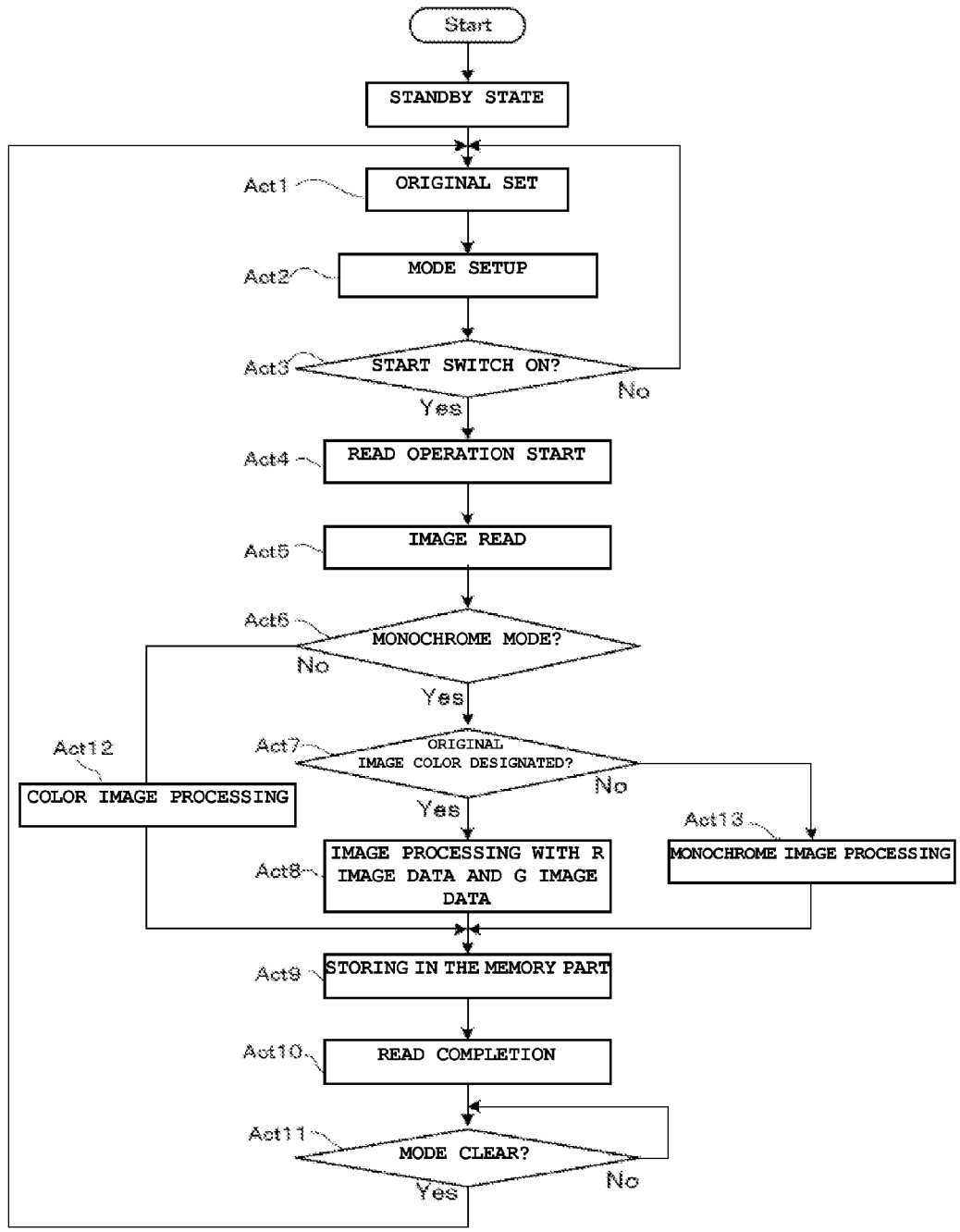
FIG. 6 is a flow chart showing operations of the read unit, according to embodiments.

Next, an image read processing operation of the read unit 106 will be explained based on a flow chart shown in FIG. 6.

In a standby state of a decolorization process, an original is set in the paper feed tray 102 (Act1), and the flow proceeds to Act2.

At Act2, the operation unit 128 decides whether the read mode is a normal mode or a monochrome mode, and sets a mode for designating the color of an original image, if the read mode is the monochrome mode. The flow then proceeds to Act3.

At Act3, if the start switch 1285 for starting an erasing operation is turned on (Yes), the flow proceeds to Act4, a read operation is started, and the flow proceeds to Act5.

At Act5, acquiring of the image is started by the color image sensor 302, and the flow proceeds to Act6.

At Act6, whether or not the mode set at Act2 is the monochrome mode is determined. If the mode is the monochrome mode (Yes), the flow proceeds to Act7. If the mode is not the monochrome mode, the mode is decided as the normal mode (No). The flow then proceeds to Act12.

At Act7, whether or not the designation of the original image color exists is decided. If the designation exists (Yes), the flow proceeds to Act8, and if the designation does not exist, the flow proceeds to Act13. Here, the case where the designation of the original image color is blue will be explained below as an example.

At Act8, since the original image color is blue, the ASIC unit 401 outputs the monochrome image signal 4014K, in which the image from the red light receiving unit is processed into a monochrome image, and the monochrome image signal 4015K, in which the image signal from the green light receiving unit is processed into a monochrome image, to the image synthesis unit 4012, and these monochrome images are then synthesized. Next, the flow proceeds to Act9.

At Act9, the image data 608 of the synthesized monochrome image is stored in the memory unit 500, and the flow then proceeds to Act10.

At Act10, the read of the image through the color image sensor 302 is completed, and the flow then proceeds to Act11.

At Act11, if the mode setup in the operation unit 128 is automatic or the mode setup is cleared by turning-on the mode clear switch 1286, the flow returns to Act1.

At Act6, if the read mode is determined to be a color mode and the flow proceeds to Act12, the ASIC unit 401 processes a color image at Act12, and the flow then proceeds to Act9. In addition, at Act7, if there is no designation of the original color image, the flow proceeds to Act13.

At Act13, the ASIC unit 401 outputs the monochrome image signal 4014K, in which the image from the red light receiving unit is processed into a monochrome image, the monochrome image signal 4015K, in which the image signal from the green light receiving unit is processed into a monochrome image, and the monochrome image signal 4016K, in which the image signal from the blue light receiving unit is processed into a monochrome image, to the image synthesis unit 4012. These monochrome images are then synthesized. Next, the flow proceeds to Act9.

In the embodiment, the case where the image reader is applied to the erasing device has been explained as an example. However, the present disclosure may also be applied to an image reader that is installed in MFP (Multi Function Peripheral).

In addition, the blue original image color for an erasable image has been explained as an example; however, other colors may also be adopted. Moreover, in the illumination unit 300, the LED light sources of R, G, and B may be separately arranged instead of the integrated configuration.

Here, the images read by the read unit 106 have been stored in the memory 500 of the erasing device 100; however, this is not limiting, and other arrangements are possible. For example, the images may be stored in a memory unit of external devices such as user terminal (Personal Computer) or a multifunction peripheral or by communications with a server via a communication interface. The image data stored in the external devices may be read out of an operation unit of the multifunction peripheral or the user terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reader for reading an original image formed on a surface of a recording medium comprising:
    an illumination unit configured to illuminate the surface with a white light source,
    a light receiving unit comprising color image sensors each configured to receive light reflected from the surface to form a monochromatic image;
    an image processing synthesis unit configured to process monochromatic images from the light receiving unit to form a synthesized image;
    an operation unit configured to designate a specific color; and a control unit configured to control the image processing synthesis unit to exclude, from the synthesized image processing, the monochromatic image from a respective one of the color image sensors that corresponds to the specific color designated in the operation unit;
    wherein the color image sensors comprise a red image sensor, a green image sensor, and a blue image sensor; and
    wherein the image processing synthesis unit is further configured to process the monochromatic images received from the light receiving unit with a binary-coded processing.

2. The image reader according to claim 1, wherein
    the original image is printed with an erasable colorant,
    a blue color is designated as the specific color in the operation unit, and
    the control part controls the image processing synthesis unit to exclude, from the synthesized image processing, the monochromatic image from a blue image sensor that is one of the color image sensors.

3. The image reader according to claim 1, further comprising:
a memory unit configured to store the synthesized image.

4. The image reader according to claim 1, wherein:
the operation unit is further configured to designate a monochromatic mode or a color mode, and
the control unit is configured to:
when the monochromatic mode is designated, control the image processing synthesis unit to exclude, from the synthesized image processing, the monochromatic image from a respective one of the color image sensors that corresponds to the specific color designated in the operation unit, and
when the color mode is designated control the image processing synthesis unit to include, in the synthesized image processing, each monochromatic image from the color image sensors.

5. The image reader according to claim 1, wherein the operation unit comprises a touch-panel display configured to accept input from a user to designate the specific color.

6. The image reader according to claim 1, wherein the operation unit communicates with the control unit over a network.

7. An eraser for erasing an original image printed with erasable colorant on a surface of a recording medium, comprising:
an illumination unit configured to illuminate the surface with a white lights a light receiving unit comprising color image sensors each configured to recieve light reflected from the surface to form a monochromatic image;
an image processing synthesis unit configured to process monochromatic images from the light receiving unit to form a synthesized image;
an operation unit configured to designate a specific color; respective one of the color image sensors that corresponds to the specific color designated in the operation unit;
an erasing unit configured to erase the original image;
the color image sensors comprise a red image sensor, a green image sensor, and a blue image sensor; and
the image processing synthesis unit is further configured to process the monochromatic images received from the light receiving unit with a binary-coded processing.

8. The eraser according to claim 7, wherein the control unit is further configured to determine whether the recording medium on which the original image was erased can be reused.

9. The eraser according to claim 8, wherein the control unit determines whether the recording medium can be reused based on a presence on the recording medium of one or more of: a residual image, a wrinkle, a fold, breakage, and a hole.

10. The eraser according to claim 7, wherein
the original image is printed with a blue erasable colorant,
a blue color is designated as the specific color in the operation unit, and
the control part controls the image processing synthesis unit to exclude, from the synthesized image processing, the monochromatic image from a blue image sensor that is one of the color image sensors.

11. The eraser according to claim 7, further comprising:
a memory unit configured to store the synthesized image that is synthesized from monochromatic images received by the color image sensors before the original image is erased by the erasing unit.

12. The eraser according to claim 7, wherein the operation unit comprises a touch-panel display configured to accept input from a user to designate the specific color.

13. An image reading method comprising:
illuminating a surface of a recording medium with a white light source;
forming monochromatic images in color image sensors from light reflected from the surface;
receiving a designation of a specific color; and processing the monochromatic images, except the monochromatic image from a respective one of the color image sensors that corresponds to the designated specific color, to form a synthesized image;
wherein processing the monochromatic images comprises processing the monochromatic images with a binary-coded processing.

14. The image reading method according to claim 13, further comprising erasing an image formed on the surface.

15. The image reading method according to claim 14, further comprising determining whether the recording medium can be reused based on a presence on the recording medium of one or more of: a residual image, a wrinkle, a fold, breakage, and a hole.

16. The image reading method according to claim 13, further comprising storing the synthesized image.

17. The image reading method according to claim 13, wherein receiving the designation of the specific color comprises accepting an input from a user with a touch-panel display.

* * * * *